(12) United States Patent
Neumann et al.

(10) Patent No.: US 12,025,088 B2
(45) Date of Patent: Jul. 2, 2024

(54) INTERNAL COMBUSTION ENGINE COMPRISING AT LEAST ONE CYLINDER EQUIPPED WITH A PRE-CHAMBER, AN INJECTOR AND TWO SPARK PLUGS, AND METHOD FOR OPERATING SAME

(71) Applicant: Bayerische Motoren Werke Aktiengesellschaft, Munich (DE)

(72) Inventors: Juergen Neumann, Valley (DE); Marcus Poeschl, Reichertshausen (DE); Stephan Rubbert, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/032,730

(22) PCT Filed: Nov. 2, 2021

(86) PCT No.: PCT/EP2021/080345
§ 371 (c)(1),
(2) Date: Apr. 19, 2023

(87) PCT Pub. No.: WO2022/106189
PCT Pub. Date: May 27, 2022

(65) Prior Publication Data
US 2023/0383717 A1 Nov. 30, 2023

(30) Foreign Application Priority Data
Nov. 23, 2020 (DE) ...................... 10 2020 130 836.1

(51) Int. Cl.
*F02P 15/02* (2006.01)
*F02B 19/10* (2006.01)
(Continued)

(52) U.S. Cl.
CPC .......... *F02P 15/02* (2013.01); *F02B 19/1023* (2013.01); *F02B 19/12* (2013.01);
(Continued)

(58) Field of Classification Search
CPC ..... F02P 15/02; F02P 5/1502; F02B 19/1023; F02B 19/12; F02B 2023/085; F02B 2075/125
See application file for complete search history.

(56) References Cited

U.S. PATENT DOCUMENTS 5,709,189 A * 1/1998 Monnier ............... F02F 1/4214
123/260
7,740,009 B2 6/2010 Shelby et al.
(Continued)

FOREIGN PATENT DOCUMENTS

| AT | 522462 B1 | 11/2020 |
|---|---|---|
| CN | 101037969 B | 10/2012 |

(Continued)

OTHER PUBLICATIONS

International Search Report (PCT/ISA/210) issued in PCT Application No. PCT/EP2021/080345 dated Feb. 18, 2022 with English translation (five (5) pages).
(Continued)

*Primary Examiner* — Grant Moubry
*Assistant Examiner* — James G Moubry
(74) *Attorney, Agent, or Firm* — Crowell & Moring LLP

(57) ABSTRACT

An internal combustion engine may include a combustion chamber which is delimited by a cylinder; an injector with which fuel can be injected into the combustion chamber, whereby a mixture comprising fuel and air can be generated in the combustion chamber; a pre-chamber, which is fluidically separate from the combustion chamber with the exception of a passage opening and which is fluidically connected
(Continued)

to the combustion chamber via the passage opening; a first spark plug with which an ignition spark can be produced in the pre-chamber; and a second spark plug with which an ignition spark can be produced in the combustion chamber and outside of the pre-chamber, wherein the pre-chamber, the injector, and the second spark plug are arranged, in this order, in a direction extending in a plane that is perpendicular to the axial direction of the cylinder.

17 Claims, 3 Drawing Sheets

(51) Int. Cl.
    *F02B 19/12*   (2006.01)
    *F02P 5/15*    (2006.01)
    *F02B 23/08*   (2006.01)
    *F02B 75/12*   (2006.01)

(52) U.S. Cl.
    CPC ....... *F02P 5/1502* (2013.01); *F02B 2023/085* (2013.01); *F02B 2075/125* (2013.01)

(56) References Cited

U.S. PATENT DOCUMENTS

| | | | |
|---|---|---|---|
| 8,006,666 | B2 | 8/2011 | Ashida et al. |
| 9,567,896 | B2 | 2/2017 | Pouring et al. |
| 2007/0215102 | A1 | 9/2007 | Russell et al. |
| 2007/0221164 | A1* | 9/2007 | Ashida ............... F02B 19/12 123/267 |
| 2014/0209057 | A1* | 7/2014 | Pouring .............. F02B 19/1009 123/257 |
| 2017/0241325 | A1* | 8/2017 | Gu ........................... F02D 19/06 |
| 2018/0128157 | A1* | 5/2018 | VanDerWege .......... F02B 19/12 |
| 2019/0078498 | A1* | 3/2019 | Bedogni .............. F02B 19/1019 |
| 2019/0323415 | A1 | 10/2019 | Corrigan et al. |
| 2019/0360385 | A1 | 11/2019 | Kulzer |

FOREIGN PATENT DOCUMENTS

| | | |
|---|---|---|
| DE | 10 2005 037 551 A1 | 2/2007 |
| DE | 10 2018 112 450 A1 | 11/2019 |
| DE | 10 2019 002 476 A1 | 10/2020 |
| DE | 10 2020 110 960 A1 | 10/2020 |
| EP | 3 453 856 A1 | 3/2019 |
| EP | 3 561 255 A1 | 10/2019 |
| JP | 2007321682 A * 12/2007 .............. F02P 15/02 |
| WO | WO 2019/125430 A1 | 6/2019 |

OTHER PUBLICATIONS

German-language Written Opinion (PCT/ISA/237) issued in PCT Application No. PCT/EP2021/080345 dated Feb. 18, 2022 (five (5) pages).

German-language Search Report issued in German Application No. 10 2020 130 836.1 dated Jul. 19, 2021 with partial English translation (14 pages).

* cited by examiner

INTERNAL COMBUSTION ENGINE COMPRISING AT LEAST ONE CYLINDER EQUIPPED WITH A PRE-CHAMBER, AN INJECTOR AND TWO SPARK PLUGS, AND METHOD FOR OPERATING SAME

BACKGROUND AND SUMMARY

The invention relates to an internal combustion engine. Furthermore, the invention relates to a method for operating such an internal combustion engine.

US 2019/0323415 A1 discloses an internal combustion engine comprising at least one cylinder by means of which a combustion chamber is partially delimited. A pre-chamber is provided which is fluidically connected to the combustion chamber via passage openings formed in a wall, and is otherwise separated from the combustion chamber. Ignition sparks can be produced in the pre-chamber by means of a first spark plug, and ignition sparks can be produced in the combustion chamber outside the ignition chamber by means of a second spark plug. In addition, CN 101037969 B or U.S. Pat. No. 7,740,009 B2 discloses a system for operating an ignition of an engine.

It is an object of the present invention to provide an internal combustion engine and a method for operating such an internal combustion engine such that particularly advantageous operation of the internal combustion engine can be realized.

This object is achieved according to the invention by an internal combustion engine having the features of the independent claims. Advantageous refinements of the invention are the subject matter of the dependent claims.

A first aspect of the invention relates to an internal combustion engine designed as a reciprocating piston engine. The internal combustion engine can be used for a motor vehicle, in particular for a car. However, the internal combustion engine could also be used for any other applications, for example as a stationary engine or as a ship's engine or as another engine. The internal combustion engine can be operated with liquid fuel, or the internal combustion engine is a gas engine which is operable with a gaseous fuel. With reference to the motor vehicle, it is conceivable that the motor vehicle when fully manufactured has the internal combustion engine and can be driven by combustion with the internal combustion engine. The internal combustion engine has at least one combustion chamber which is partially delimited by a cylinder. For example, a piston is accommodated in a translationally movable manner in the cylinder, the combustion chamber being partially delimited by the cylinder and partially by the piston. In addition, the internal combustion engine comprises an injector which is assigned to the combustion chamber and with which an, in particular liquid, fuel can be injected directly into the combustion chamber. With the direct injection of the fuel into the combustion chamber, a fuel-air mixture, also referred to simply as mixture, can be produced or can be received in the combustion chamber, the mixture comprising the fuel injected directly into the combustion chamber with the injector and air which is conducted or has been conducted into the combustion chamber. It is conceivable for the internal combustion engine to comprise an intake manifold injection which is combined with the direct injection. In the case of the intake manifold injection, the fuel is injected into an intake tract of the internal combustion engine, also referred to as inlet tract, and therefore into the air flowing through the intake tract upstream of the combustion chamber.

In addition, the internal combustion engine has a pre-chamber which is assigned to the combustion chamber and, except for at least one passage opening, in particular except for a plurality of passage openings, is fluidically separated from the combustion chamber and is fluidically connected via the at least one passage opening or via the plurality of passage openings to the combustion chamber. In particular, the following should be understood by this: the pre-chamber, in particular the volume thereof, is at least partially, in particular at least predominantly or completely, delimited by a, for example, single-part or multi-part chamber element, in particular by a, for example, single-part wall, wherein the at least one passage opening or the plurality of passage openings is or are formed in the chamber element and penetrates or penetrate the chamber element such that the pre-chamber is fluidically connected via the at least one passage opening or via the passage openings to the combustion chamber and otherwise is fluidically separated from the combustion chamber with the chamber element, in particular with the wall. The fluidic connection of the pre-chamber to the combustion chamber via the at least one passage opening enables at least a portion of the mixture formed in the combustion chamber and in particular outside the pre-chamber or received in the combustion chamber to be conducted into the pre-chamber via the passage opening. If, for example, the piston moves in the direction of its top dead center, the piston conveys, in particular presses, for example, at least the aforementioned portion of the mixture out of the combustion chamber through the at least one passage opening and thereby into the pre-chamber.

The internal combustion engine furthermore has a first spark plug which is also referred to as a pre-chamber spark plug and with which, in particular within an operating cycle of the internal combustion engine, at least one ignition spark can be produced in the pre-chamber for igniting the portion of the mixture conducted via the at least one passage opening into the pre-chamber. The ignition spark which can be produced with the first spark plug is also referred to as first ignition spark. The internal combustion engine also comprises a second spark plug which is assigned to the combustion chamber and with which, in particular within a or the operating cycle of the internal combustion engine, at least one ignition spark, also referred to as second ignition spark, can be produced in the combustion chamber and therefore outside the pre-chamber for igniting the mixture received or remaining in the combustion chamber.

In order now to be able to realize a particularly advantageous, in particular fired, operation of the internal combustion engine, provision is made according to the invention that the pre-chamber, the injector and the second spark plug are arranged in the following sequence along a, preferably rectilinear, direction running in a plane extending perpendicularly to the axial direction of the cylinder: the pre-chamber-the injector-the second spark plug. This should be understood as meaning that the pre-chamber, the injector and the second spark plug are arranged one behind another or consecutively along the direction, that is to say along a viewing direction running along the or in the direction, such that, along the direction, that is to say in a viewing direction running along the or in the direction, the injector follows the pre-chamber and the second spark plug follows the injector, and therefore, as it were, the pre-chamber is arranged upstream of the injector and the second spark plug, and the spark plug is arranged downstream of the pre-chamber and the injector, or that the injector is arranged between the pre-chamber and the second spark plug, with provision not necessarily having to be made for the, for example, rectilinear direction or an imaginary straight line coinciding, for example, with the direction intersects the pre-chamber, the injector and the spark plug.

The described arrangement of the pre-chamber, the injector and the second spark plug makes it possible to create an advantageous combustion chamber geometry such that, for example, an at least substantially central position of the injector, also referred to as injector position, can be created or maintained, in particular despite the use both of the pre-chamber and of the second spark plug. In addition, for example, a particularly advantageous, in particular shallow, angle can be realized that the second spark plug, in particular its longitudinal axis and very particularly its longitudinal central axis, encloses with the axial direction of the cylinder, in particular with the cylinder axis thereof, or with the radial direction of the cylinder. The cylinder axis mentioned should be understood as meaning in particular a or the central axis of the cylinder which, for example, can be formed at least substantially rotationally symmetrically with respect to the cylinder axis. The second spark plug, in particular the tip thereof, at which the second ignition spark can be produced with the second spark plug, can project here particularly far into the combustion chamber. As a result, the second spark plug, in particular the tip thereof, can be arranged very close to the injector. In other words, it is possible for the second spark plug, in particular the tip of the second spark plug, to be particularly relatively close to the injector, and therefore the mixture can be particularly advantageously ignited. In particular, possible weaknesses or disadvantages of the pre-chamber or of the pre-chamber spark plug can be compensated for by the central injector position, and therefore a particularly advantageous, in particular more efficient and/or low emission and/or low fuel consumption, operation of the internal combustion engine can be realized. The pre-chamber or the pre-chamber spark plug is a passive pre-chamber or a passive pre-chamber spark plug since the mixture is first of all produced in the combustion chamber outside the pre-chamber and conducted, in particular conveyed with the piston, via the at least one passage opening into the pre-chamber. Furthermore, a relatively central position of the second spark plug, in particular the tip thereof, can be created, as a result of which the second spark plug or the tip thereof can be detected particularly advantageously by a load movement in the combustion chamber. As a result, particularly stable combustion can be ensured.

The second spark plug is preferably not a pre-chamber spark plug, consequently is a spark plug different from a pre-chamber spark plug. Expressed again in other words, provision is preferably made that the internal combustion engine is free from a pre-chamber in which the second ignition spark can be produced with the second spark plug. This can effectively and efficiently compensate for any weaknesses or disadvantages of pre-chamber spark plugs or of the pre-chamber spark plug with the second spark plug, and therefore a particularly advantageous operation of the internal combustion engine can be produced.

In an advantageous refinement of the invention, provision is made that a or the aforementioned straight line which runs parallel to the direction or coincides with the direction and runs in the plane running perpendicularly to the axial direction of the cylinder and therefore perpendicularly to the cylinder axis intersects the pre-chamber, the injector and the second spark plug. In other words, the pre-chamber, the injector and the second spark plug are also referred to as structural elements. It is conceivable in principle for at least one of the structural elements to be arranged completely offset along an offset straight line running perpendicularly to the straight line and in the plane with respect to the respective other structural elements. However, provision is preferably made that the straight line which runs parallel to the direction or coincides with the direction and runs in the plane intersects the pre-chamber, the injector and the second spark plug such that the structural elements are arranged in pairs and in each case at least partially at the same height along the offset straight line. As a result, particularly advantageous operation of the internal combustion engine can be realized since particularly advantageous and in particular stable combustion of the mixture can be ensured.

A further embodiment is distinguished in that the aforementioned straight line runs through the cylinder axis, which is also referred to as the central axis, of the cylinder. By this means, a particularly advantageous arrangement of the structural elements can be realized, and therefore a particularly advantageous and in particular efficient operation of the internal combustion engine can be produced.

In a further particularly advantageous embodiment of the invention, provision is made that the pre-chamber is arranged offset in relation to the injector toward an outlet side of the combustion chamber, and therefore, as considered the other way around, the injector is arranged in relation to the pre-chamber in a manner offset toward an inlet side of the combustion chamber opposite the outlet side. The aforementioned air is conducted into the combustion chamber on the inlet side. For example, at least one inlet channel is assigned to the combustion chamber. In particular, it is conceivable for at least or precisely two inlet channels to be assigned to the combustion chamber. The respective inlet channel is arranged on the inlet side and the air can flow through it, and therefore the air flowing through the inlet channel can be conducted or can be introduced with the inlet channel into the combustion chamber. The inlet channel opens per se into the combustion chamber. Furthermore, it is conceivable for at least one outlet channel to be assigned to the combustion chamber. In particular, at least or precisely two outlet channels are assigned to the combustion chamber. The respective outlet channel is arranged on the outlet side. The ignition and combustion of the mixture results in exhaust gas from the internal combustion engine, the exhaust gas of which can flow out of the combustion chamber and into the respective outlet channel. The respective outlet channel opens per se into the combustion chamber. In other words, the exhaust gas can be removed from the combustion chamber with the outlet channel. The respective inlet channel is assigned, for example, a respective inlet valve which is movable, in particular translationally, in particular relative to a cylinder head of the internal combustion engine, translationally between a first closed position and at least one first open position. In the closed position, the inlet valve blocks the associated inlet channel such that, in the closed position, the respective inlet channel is fluidically separated from the combustion chamber with the inlet valve. In the first open position, however, the inlet valve opens up the associated inlet channel, and therefore, in the first open position, the inlet channel is fluidically connected to the combustion chamber, in particular via the associated inlet valve. Accordingly, for example, the respective outlet channel is assigned a respective outlet valve which is movable, in particular translationally, in particular relative to the cylinder head, between a second closed position and at least one second open position. In the second closed position, the respective outlet valve blocks the respective associated outlet channel, and therefore, in the second closed position, the outlet channel is fluidically separated from the combustion chamber with the associated outlet valve. In the second open position, however, the outlet valve opens up the associated outlet channel, and therefore, in the second open position, the outlet channel is fluidically connected to the combustion chamber, in particular via the respectively associated outlet valve. Therefore, in the first open position, the air can flow into the combustion chamber via the respective inlet valve, and, in the second open position, exhaust gas can flow into the outlet channel via the respective outlet valve. Since, on the outlet side, the exhaust gas flows out of the combustion chamber, the outlet side is hotter than the inlet side. The invention is based in particular on the finding that the outlet side which is hotter than the inlet side may frequently be a starting place of knocking combustion or knocking operating cycles. With the offset of the pre-chamber in relation to the injector toward the outlet side, the outlet side is reached particularly early or earlier than if the pre-chamber is arranged offset toward the inlet side, by a flame front resulting from the ignition of the mixture or of the portion, as a result of which the knocking tendency can be kept particularly low.

The cylinder or the combustion chamber is preferably divided by an imaginary separating plane into the outlet side and the inlet side, the imaginary separating plane running in the axial direction and therefore along the cylinder axis (central axis of the cylinder) in such a manner that the cylinder axis runs in the plane. Provision is preferably made here for the or all of the inlet valves which are assigned to the combustion chamber and via which the air can be conducted into the combustion chamber to be arranged on the inlet side, while the or all of the outlet valves assigned to the combustion chamber and via which the exhaust gas can be removed from the combustion chamber are arranged on the outlet side. It has proven advantageous here if the injector is arranged at least predominantly, in particular completely, on the inlet side, with it being possible for the pre-chamber to preferably be arranged at least predominantly, in particular completely, on the outlet side. The described arrangement of the structural elements mean that the second spark plug or the tip thereof is preferably arranged on the inlet side.

In a further particularly advantageous embodiment of the invention, the pre-chamber is at least partially arranged between the outlet valves of the internal combustion engine that are arranged on the outlet side and are assigned to the combustion chamber. For example, a further straight line, for example the offset straight line, running perpendicularly to the aforementioned straight line, therefore preferably runs through the outlet valves and through the pre-chamber. Particularly advantageous operation can thereby be realized.

Provision is preferably made that the second spark plug, in particular the tip thereof, is arranged under the inlet channels or the inlet valves, in particular in the axial direction of the cylinder.

In a further particularly advantageous embodiment of the invention, an ignition point is provided at which the second ignition spark can be produced with the second spark plug.

It has been shown to be particularly advantageous if the ignition point is arranged in an edge region of the combustion chamber and preferably on the inlet side. As a result, the mixture received or remaining in the combustion chamber can be particularly advantageously ignited with the second spark plug, and therefore, for example, possible weaknesses or disadvantages of the pre-chamber or of the pre-chamber spark plug can be very readily compensated for.

A further embodiment makes provision that the ignition point or the aforementioned tip of the second spark plug, in particular along the aforementioned further straight line or the offset straight line, is arranged between the inlet valves of the internal combustion engine that are arranged on the inlet side and are assigned to the combustion chamber. As a result, the mixture can be particularly advantageously ignited with the second spark plug, and therefore particularly advantageous operation of the internal combustion engine can be produced.

Furthermore, provision can advantageously be made that the largest angle which the second spark plug, in particular the direction of longitudinal extent thereof or longitudinal axis, encloses with the cylinder axis or with a plane over which the cylinder axis runs, is an obtuse angle, in particular greater than 90 degrees and smaller than 110 degrees, preferably greater than 90 degrees and smaller than 100 degrees and very preferably greater than degrees and at most or smaller than 95 degrees. As a result, the second spark plug can be advantageously arranged or aligned flat such that particularly advantageous operation, in particular secure and stable combustion, can be realized.

In a further particularly advantageous refinement of the invention, the injector is designed to inject the fuel directly into the combustion chamber with formation of fuel jets, which are formed by the fuel, in particular spray jets, in such a manner that the or all of the fuel jets, in particular the respective central longitudinal axes thereof, bypass the pre-chamber, consequently do not strike directly against or onto the pre-chamber or the chamber element. Expressed again in other words, the pre-chamber or the chamber element is arranged between the fuel jets, which are also referred to as spray jets or are designed as spray jets, such that the fuel jets (spray jets) go past the pre-chamber or the chamber element. Furthermore, provision is preferably made here that at least or precisely one of the fuel jets strikes directly against the second spark plug, in particular the tip thereof, at which the ignition spark can be produced with the second spark plug. A special jet geometry, in particular spray geometry, of the injector is therefore provided, and therefore the at least or precisely one fuel jet as an ignition jet advantageously reaches the second spark plug, which is preferably designed as an edge spark plug, in particular the tip thereof. The remaining fuel jets are oriented away from the pre-chamber or from the chamber element so that the pre-chamber or the chamber element delimiting the pre-chamber is not wetted by the liquid fuel which forms the fuel jets and accordingly is sprayed out of the injector, and/or that no liquid fuel penetrates the pre-chamber via the passage opening.

Furthermore, it is conceivable for the spark plug, which is preferably designed as an edge spark plug, to alternatively be arranged, in particular with a similar geometry, between the outlet valves and, as a result, for comparable effects to be obtained. In other words, it is conceivable for the second spark plug, in particular the tip thereof, to be arranged on the outlet side. In comparison to the arrangement of the second spark plug, in particular the tip thereof, on the inlet side, it is then, however, more difficult to arrange ignition coils and ignition cables for the second spark plug on the outlet side since a construction space may be limited there because of one or more turbochargers and then the aforementioned components would be thermally loaded.

A second aspect of the invention relates to a method for operating an internal combustion engine according to the first aspect of the invention. Advantages and advantageous refinements of the first aspect of the invention should be considered to be advantages and advantageous refinements of the second aspect of the invention, and vice versa.

In an advantageous refinement of the second aspect of the invention, provision is made that within at least one operating cycle of the internal combustion engine first of all at least one first ignition spark for igniting the mixture in the combustion chamber is produced with the second spark plug, after which at least one second ignition spark is produced in the pre-chamber with the first spark plug, wherein production of an ignition spark by the first spark plug is suppressed within the operating cycle before the first ignition spark is produced with the second spark plug and during the production of the first ignition spark with the second spark plug. This means that ignition takes place within the at least one operating cycle first of all with the second spark plug and then only via the second spark plug. Particularly advantageous and in particular efficient operation can thereby be realized. In particular, particularly stable combustion can be ensured.

A further embodiment is distinguished in that in at least a first partial region of a or the characteristic map, also referred to as engine characteristic map, of the internal combustion engine, respective ignition sparks are produced within respective operating cycles, belonging to the first partial region, of the internal combustion engine both with the first spark plug and with the second spark plug. In at least a second partial region of the characteristic map, the second partial region of which comprises higher loads and higher rotational speeds than the first partial region, with reference to the spark plugs respective ignition sparks are produced within respective operating cycles, belonging to the second partial region, of the internal combustion engine exclusively with the first spark plug, and therefore the second spark plug is deactivated, in particular continuously or without interruption, in the second partial region. Since the second partial region comprises higher rotational speeds and higher loads than the first partial region, the second partial region follows the first partial region in the engine characteristic map in the direction of higher loads and higher rotational speeds. Expressed again in other words, the second partial region, in particular directly, adjoins the first partial region in the engine characteristic map in the direction of higher loads and higher rotational speeds.

It has been shown to be particularly advantageous if ignition times or ignition angles at which respective ignition sparks are produced with the second spark plug are set with an electronic computing device of the internal combustion engine, the electronic computing device of which is also referred to as engine controller or engine control unit, independently of ignition times or ignition angles at which respective ignition sparks are produced with the first spark plug. By this means, the ignition sparks can be produced with the spark plugs particularly in a manner meeting requirements, in particular such that particularly efficient operation of the internal combustion engine can be realized.

Alternatively or additionally, provision can be made that at least one ignition parameter, according to which at least one respective ignition spark is produced with the respective spark plug, is set, in particular depending on operation or depending on the operating point. The ignition parameter comprises, for example, ignition energy of the respective ignition spark and/or a duration of the respective ignition spark, also referred to as spark duration, and/or a respective spark current for producing the respective ignition spark. The spark plugs are also referred to as ignition systems. Provision is preferably made here that the ignition systems can set their respective ignition parameter or their respective ignition parameters independently of one another.

In a further particularly advantageous embodiment of the invention, provision is made that ignition times at which respective ignition sparks are produced with the second spark plug are set with the electronic computing device on the basis of a first characteristic map which is independent of a second characteristic map, on the basis of which ignition times at which respective ignition sparks are produced with the first spark plug are set with the electronic computing device. By this means, the first spark plug can be operated at least virtually independently of the second spark plug, and therefore the spark plugs can be used to meet requirements for producing ignition sparks. As a result, particularly advantageous operation of the internal combustion engine can be ensured.

Finally, it has been shown to be particularly advantageous if ignition times at which respective ignition sparks are produced with the second spark plug are set with the electronic computing device depending on a or the load, a temperature and a or the rotational speed of the internal combustion engine. Particularly advantageous operation of the second spark plug can thereby be realized, and therefore particularly advantageous and in particular efficient and therefore low fuel consumption operation of the internal combustion engine can be ensured.

The internal combustion engine has, for example, an output shaft which is designed as a crankshaft and is connected in an articulated manner to the piston via a connecting rod. By this means, the translational movements of the piston in the cylinder can be converted into a rotational movement of the output shaft. The respective operating cycle of the crankshaft comprises, for example, precisely two complete revolutions of the crankshaft, consequently 720 degrees of crank angle, in particular whenever the internal combustion engine is in the form of a four stroke engine. The internal combustion engine is therefore preferably in the form of a four stroke engine, and therefore the respective operating cycle comprises precisely four strokes of the internal combustion engine. Of course, however, the invention can also be used for other engines, such as, for example, two stroke engines and/or Wankel engines. In the case of a four stroke engine that is described by way of example below, a first of the strokes is an inlet or intake stroke, in which the piston moves from its top dead center into its bottom dead center and air is introduced into the combustion chamber. A second of the strokes is a compression stroke, in which the piston moves from its bottom dead center into its top dead center and compresses the mixture in the process. The second stroke preferably immediately follows the first stroke, and therefore there is no other, further stroke of the internal combustion engine between the first and the second stroke. A third of the strokes is an operating stroke, in which the piston is driven, and therefore moved from a top dead center to its bottom dead center, by the fact that the mixture has been ignited and combusted. The third stroke preferably directly adjoins the second stroke. The fourth stroke, which preferably directly adjoins the third stroke, is an outlet stroke or exhaust stroke, in which the piston moves from its bottom dead center into its top dead center and, in the process, discharges the exhaust gas from the combustion chamber, in particular into the respective outlet channel. The aforementioned rotational speed of the internal combustion engine should be understood as meaning a or the rotational speed of the crankshaft which, in particular during the fired operation of the internal combustion engine, rotates at the rotational speed relative to a housing element of the internal combustion engine, said housing element being in the form, for example, of a crankcase, in particular a cylinder crankcase. The aforementioned load should be understood as meaning in particular a torque which is provided by the internal combustion engine via the crankshaft.

The method according to the invention is an advantageous operating strategy which comprises, for example, an injection strategy and/or an ignition strategy. For example, according to the injection strategy, the fuel is injected with the injector directly into the combustion chamber, in particular within the respective operating cycle. According to the ignition strategy, the spark plugs are operated, and therefore according to the ignition strategy, ignition sparks are produced with the spark plugs in accordance with requirements. By interaction of the injection strategy and the ignition strategy, the pre-chamber or pre-chamber spark plug can be optimized in respect of its effect, and possible disadvantages or weaknesses of the pre-chamber spark plug or of the pre-chamber can be compensated for.

The invention is based in particular on the following considerations and findings: in the case of a low load, also referred to as engine load, of the internal combustion engine and especially in hot running, also referred to as engine hot running, of the internal combustion engine, the pre-chamber may cause delayed combustions and ignition misfires. In these operating states, the mixture is ignited in the combustion chamber outside the pre-chamber with the second spark plug, which is in the form, for example, of an edge spark plug, and the pre-chamber spark plug is ignited, or the mixture is ignited with the pre-chamber spark plug, significantly later in order to minimize cyclic fluctuations. The effect of the pre-chamber or pre-chamber spark plug is increased if, before the ignition of the pre-chamber, that is to say before the ignition in the pre-chamber, the combustion is triggered by the second spark plug and, as a result, an increase in pressure and temperature is brought about in the pre-chamber. In the event of excessively late ignition of the pre-chamber, that is to say in the event of excessively late ignition in the pre-chamber, the flame front, however, has reached the pre-chamber, and exhaust gas is pushed into the pre-chamber, which may lead to the combustion in the pre-chamber being extinguished. Accordingly, there is an advantageous differential angle, depending on temperature, load and rotational speed, between the ignition of the second spark plug and the ignition of the pre-chamber spark plug, consequently in the pre-chamber. The differential angle is understood as meaning a difference between the ignition time at which an ignition spark is produced in the pre-chamber with the first spark plug and the ignition time at which an ignition spark is produced outside the pre-chamber with the second spark plug.

As the engine load increases, the pre-chamber or the pre-chamber spark plug becomes increasingly effective and determines the combustion. The second spark plug brings about only a small acceleration of the combustion. In this operating range, a residual portion of gas in the combustion chamber can be increased by a greater valve overlap and/or by external exhaust gas recycling in order to reduce the fuel consumption and to minimize nitrogen oxide emissions (NOx emissions). In addition, a greater ignition angle difference between the second spark plug and the pre-chamber spark plug can limit the maximum pressure gradient and advantageously influence the engine acoustics. At a higher engine load and/or at high rotational speeds, in particular at rotational speeds above 3000 revolutions per minute, this involving a range in which an exhaust gas turbocharger charges the internal combustion engine, and consequently compresses the air being supplied to the combustion chamber, the second spark plug or its ignition no longer has an advantageous effect on the combustion sequence, and therefore it is advantageous to switch off the second spark plug. This is understood as meaning that operation of the second spark plug is then suppressed, and, consequently, ignitions or ignition sparks brought about by the second spark plug are suppressed. Especially, therefore, a temperature of a ground electrode of the second spark plug is kept sufficiently low, and the risk of pre-ignitions can likewise be kept particularly low. Within the range of knocking operation, a knock control which counteracts the knocking operation is intended to act on both ignition systems, consequently on both spark plugs, and to operate, in particular control, the spark plugs, for example, on the basis of a different parameter setting. To this end, it is advantageous if the two ignition systems, that is to say if the two spark plugs, are operated independently of one another, and consequently can be operated, in particular on the basis of mutually independent characteristic maps and/or algorithms. Furthermore, diagnostic functions are advantageous in order, for example, to identify a failure of one of the ignition systems, for example via a structureborne sound signal of a knocking sensor and evaluation of a crankshaft sensor in respect of rotational non-uniformity, in particular of the crankshaft. The knocking can alternatively or additionally be controlled by an ion-current measurement at a or the respective spark plug or at both spark plugs and can therefore bypass the disadvantages of a structureborne sound sensor arrangement.

In the low load range, in particular in the first partial region of the characteristic map, the combustion stability can be assisted by a dual injection. A dual injection should be understood as meaning in particular that, in particular in the first partial region of the characteristic map, precisely two consecutive and temporally spaced-apart injections are carried out within the respective operating cycle with the injector, wherein the fuel is injected directly into the combustion chamber by the respective injection with the injector. The respective injection is also referred to as injection pulse. With a late, second injection pulse, an advantageously enriched mixture can be produced in the vicinity of the second spark plug with advantageous ignition conditions, which contributes to a lower misfire rate.

In the event of a high engine load, in particular in the second partial region, there can be the risk of pre-ignitions in the pre-chamber because of high temperatures especially of a ground electrode of the first spark plug. In order to minimize the tendency to pre-ignition, a triple injection can be used, that is to say carried out, here. The triple injection should be understood as meaning in particular that, in particular in the second partial region, precisely three injections are carried out within the respective operating cycle with the injector, with the injections being spaced apart temporally from one another and following one another. Within the scope of the respective injection, the fuel is directly injected into the combustion chamber with the injector. A late homogenization of the mixture can therefore contribute to avoiding pre-ignitions.

A further finding on which the invention is based is that passive pre-chamber combustion methods, that is to say combustion methods which use a passive pre-chamber or pre-chamber spark plug, have a tendency to unstable combustion at a low engine load and during engine hot running, in particular in the case of internal combustion engines in the form of Otto engines. This means that the internal combustion engine according to the invention can be in the form of an Otto engine.

In order to avoid such unstable combustions, the two spark plugs and the pre-chamber are used. It has been shown here to be advantageous if the ignition time or ignition angle of the second spark plug is set by a separate ignition angle characteristic map depending on the rotational speed, the load and the temperature of the internal combustion engine. In partial regions, for example at high loads and rotational speeds, the second spark plug is preferably deactivated so as not to adversely affect the advantageous effect of the pre-chamber. It is advantageous here if the ignition angle or the ignition time of the second spark plug can be set or is set independently of that of the pre-chamber spark plug.

The internal combustion engine according to the invention has been designed and examined in the form of a test engine, in which the second spark plug has been used and an ignition system independent of the pre-chamber spark plug produced. It has been shown that, depending on an operating state of the internal combustion engine, the ignition angle or ignition time of the second spark plug has been set before or after the ignition or the ignition angle (ignition time) of the pre-chamber spark plug. At high rotational speeds and loads, it has been shown to be advantageous to switch off the second spark plug so as to avoid the knocking tendency or pre-ignitions. Advantageously low component temperatures have been able to be achieved by the edge spark plug which was not ignited.

BRIEF DESCRIPTION OF THE DRAWINGS

Further details of the invention emerge from the description below of a preferred exemplary embodiment with the associated drawings, in which.

Similar elements are provided with the same reference signs in the figures.

DETAILED DESCRIPTION OF THE DRAWINGS

Figure 1:
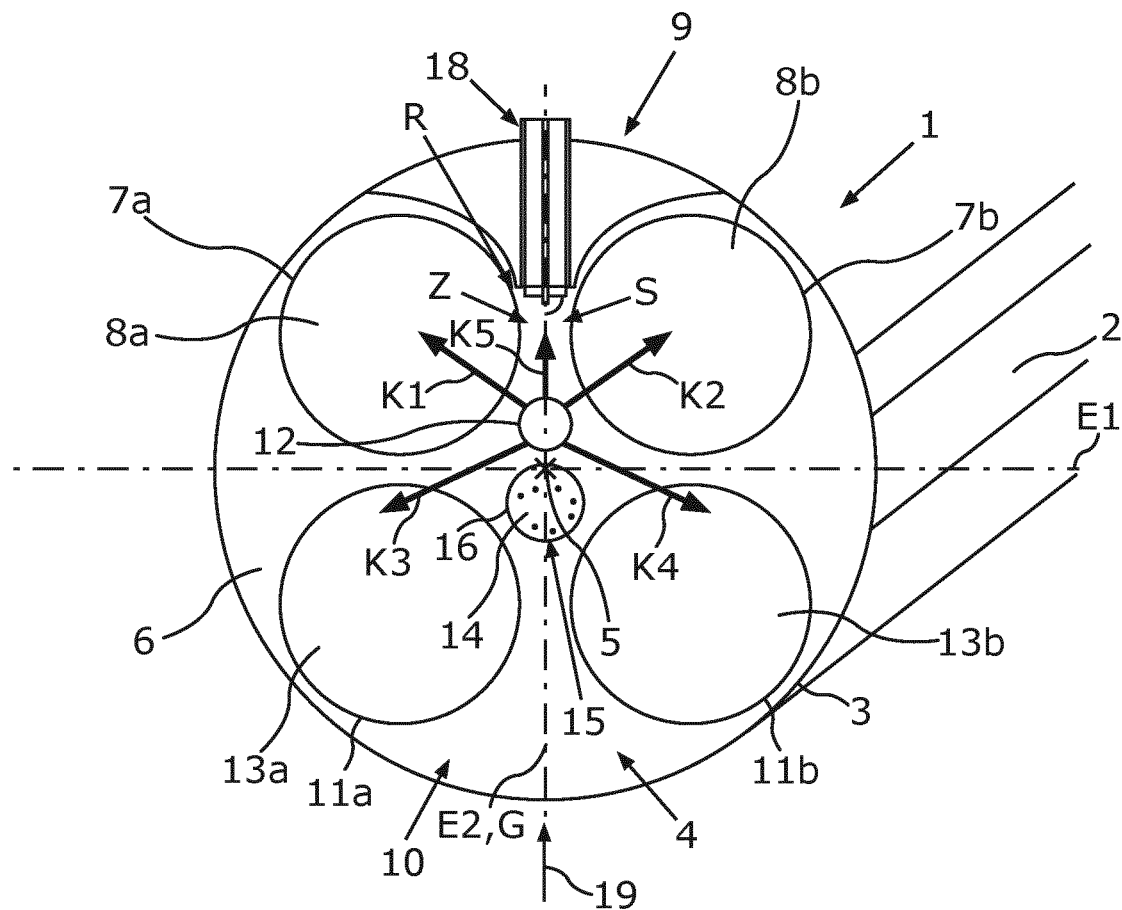
FIG. 1 shows a schematic sectional view of a detail of an internal combustion engine according to the invention.

FIG. 1 shows a schematic sectional view of a detail of an internal combustion engine 1. The internal combustion engine 1 has a housing element 2 which is preferably in the form of a crankcase, in particular a cylinder crankcase. The housing element 2 forms or delimits at least one cylinder 3 of the internal combustion engine 1. A piston, not illustrated in the figures, is accommodated in a translationally movable manner in the cylinder 3. In addition, the internal combustion engine 1 comprises an output shaft which is in the form of a crankshaft and which is mounted rotatably on the housing element 2. The piston arranged in the cylinder 3 is connected in an articulated manner to the crankshaft via a connecting rod such that the translational movements of the piston in the cylinder 3 can be converted into a rotational movement of the crankshaft. The cylinder 3 and the piston in each case partially delimit a combustion chamber 4 of the internal combustion engine 1. The cylinder 3 has a cylinder axis 5, also referred to as central axis, the cylinder 3 being at least substantially rotationally symmetrical, for example, with reference to the cylinder axis 5 which runs in the axial direction of the cylinder 3. In a first direction running parallel to the cylinder axis 5, the combustion chamber 4 is delimited by the piston. In a second direction which runs parallel to the cylinder axis 5 and is opposed to the first direction, the combustion chamber 4 is delimited by a combustion chamber roof 6. The combustion chamber roof 6 is formed, for example, by a cylinder head of the internal combustion engine 1. The cylinder head is formed separately from the housing element 2 and is connected to the housing element 2.

By way of example, the combustion chamber 4 is assigned precisely two inlet channels 7a, b which are formed or delimited, for example, by the cylinder head and open per se into the combustion chamber 4. In particular during fired operation of the internal combustion engine 1, air flows through the inlet channels 7a, b with which the air flowing through the inlet channels 7a, b is conducted into the combustion chamber 4. The respective inlet channel 7a, b is assigned a respective inlet valve 8a, b. The respective inlet valve 8a, b is movable relative to the cylinder head and/or translationally between a first closed position and at least one first open position. In the first closed position, the respective inlet valve 8a, b blocks the respectively associated inlet channel 7a, b such that the respective inlet channel 7a, b is fluidically separated from the combustion chamber 4 and air cannot flow out of the respective inlet channels 7a, b into the combustion chamber 4. However, in the respective first open position, the respective inlet valve 8a, b opens up the respectively associated inlet channel 7a, b such that the air which flows through the respective inlet channel 7a, b can flow out of the inlet channel 7a, b via the respective, opened inlet valve 8a, b and can flow or flows into the combustion chamber 4. An imaginary first plane E1 in which the cylinder axis 5 runs divides the combustion chamber 4, and therefore the cylinder 3, into an inlet side 9 and an outlet side 10. The plane E1 here divides the combustion chamber 4 or the cylinder 3 precisely in half into the inlet side 9 and the outlet side 10. It can be seen that the inlet channels 7a, b open on the inlet side 9 into the combustion chamber 4, with the inlet valves 8a, b being arranged on the inlet side 9.

Instead of the translationally movable inlet valves 8a, b, use could be made of rotary slide valves or other valves. The numbers and arrangements of the structural elements are shown and described by way of example and may vary. The previous and following statements can also be transferred to other engines, with it being possible for the internal combustion engine to be in the form of a two valve or three valve engine. A combustion method described below also functions in the case of two valve or three valve engines or other engines. Engines having five or six valves can also be equipped with pre-chambers and a second spark plug.

The combustion chamber 4 is assigned precisely two outlet channels 11a, b which are formed or delimited, for example, by the cylinder head. Furthermore, the combustion chamber 4 is assigned an injector 12 with which a liquid fuel can be injected directly into the combustion chamber 4 or is injected, in particular during the fired operation. By this means, a fuel-air mixture, also referred to simply as mixture, is formed in the combustion chamber 4, said mixture comprising the air which flows out of the inlet channels 7a, b and flows into the combustion chamber 4, consequently is conducted with the inlet channels 7a, b into the combustion chamber 4, and the fuel which is injected directly into the combustion chamber 4 with the injector 12. Alternatively or additionally, the fuel can be injected by an intake manifold injector, inter alia together with a direct-injection injector as a dual injection.

In particular, the mixture is formed within a respective operating cycle of the internal combustion engine 1. In addition, the mixture is ignited within the respective operating cycle and combusted as a result, with exhaust gas resulting from the internal combustion engine, which is preferably in the form of an Otto engine. The exhaust gas can flow into the outlet channels 11a, b and therefore can flow out of the combustion chamber 4, consequently can be removed from the combustion chamber 4 with the outlet channels 11a, b. The respective outlet channel 11a, b is assigned a respective outlet valve 13a, b. The respective outlet valve 13a, b is movable, in particular translationally and/or relative to the cylinder head, between a second closed position and at least one second open position. In the second closed position, the respective outlet valve 13a, b blocks the respective associated outlet channel 11a, b such that the respective outlet channel 11a, b is fluidically separated from the combustion chamber 4 and exhaust gas or gas cannot flow out of the combustion chamber 4 into the respective outlet channel 11a, b. However, in the respective second open position, the respective outlet valve 13a, b opens up the respectively associated outlet channel 11a, b such that the exhaust gas can flow via the respective outlet valve 13a, b into the respective outlet channel 11a, b and can therefore flow out of the combustion chamber 4. It can be seen that the outlet channels 11a, b open on the outlet side 10 into the combustion chamber 4, with the outlet valves 13a, b being arranged, in particular completely, on the outlet side 10. A further, imaginary second plane running perpendicularly to the first plane E1 is denoted by E2 in FIG. 1, the plane E2 also running through the cylinder axis 5. In addition, the internal combustion engine 1 has a pre-chamber 14 which is assigned to the combustion chamber 4 and, apart from a plurality of passage openings 15, is fluidically separated from the combustion chamber 4 and is fluidically connected via the passage openings 15 to the combustion chamber 4. For this purpose, the internal combustion engine 1 has, for example, an in particular single-piece chamber element 16 with which the pre-chamber 14, in particular the volume thereof, is at least predominantly, in particular completely, delimited. The pre-chamber 14 is fluidically separated from the combustion chamber 4 with the chamber element 16. The passage openings 15 are formed in the chamber element 16, and therefore the pre-chamber 14 is fluidically connected to the combustion chamber 4 via the passage openings 15 of the chamber element 16. By this means, at least a portion of the mixture can be conducted, that is to say can flow, out of the combustion chamber 4 via the passage openings 15 into the pre-chamber 14.

Figure 2:
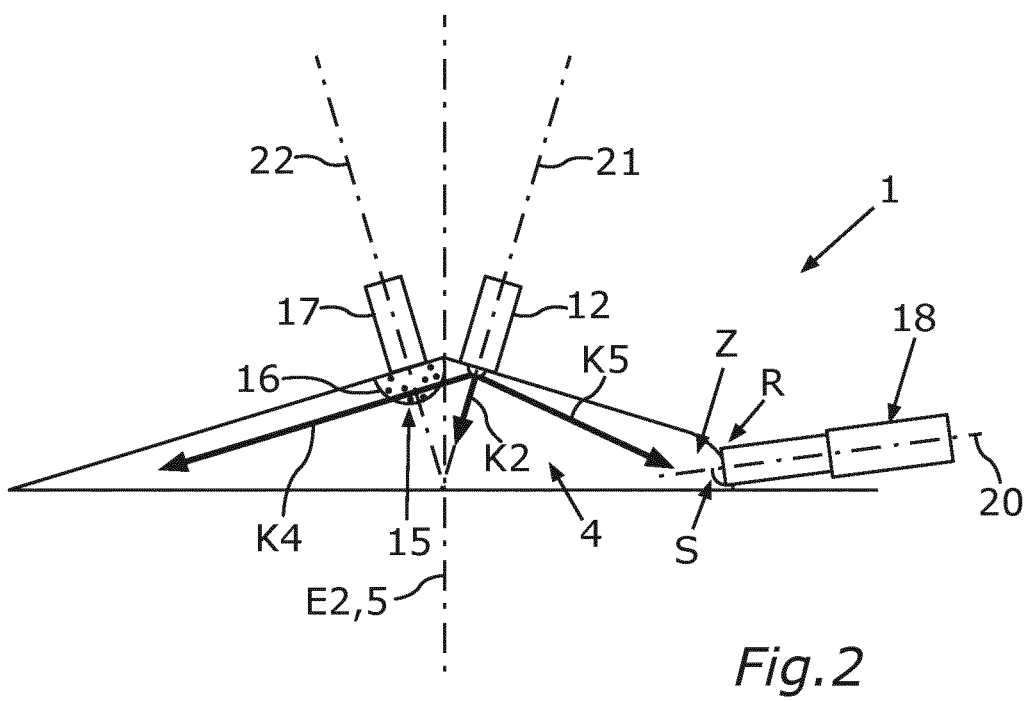
FIG. 2 shows a schematic and sectioned side view of a detail of the internal combustion engine.

The combustion chamber 4 is assigned a first spark plug 17 which is illustrated particularly schematically in FIG. 2 and is also referred to as pre-chamber spark plug and with which at least one ignition spark can be produced in the pre-chamber 14, in particular within the respective operating cycle. By this means, the portion of the mixture conducted via the passage openings 15 into the pre-chamber 14 can be ignited in the pre-chamber 14 and consequently combusted. Furthermore, the combustion chamber 4 is assigned a second spark plug 18 with which at least one ignition spark can be produced in the combustion chamber 4, and therefore outside the pre-chamber 14, in particular within the respective operating cycle, for igniting the mixture received or remaining in the combustion chamber 4.

In order then to be able to realize particularly advantageous and in particular efficient operation of the internal combustion engine 10, provision is made that the pre-chamber 14, the injector 12 and the second spark plug 18 are arranged one behind another or consecutively along a rectilinear direction running in a plane extending perpendicularly to the axial direction of the cylinder 3 and therefore perpendicularly to the planes E1 and E2 and running in the plane E2 and shown in FIG. 1 by an arrow 19, in the following sequence: the pre-chamber 14-the injector 12-the second spark plug 18. The direction shown by the arrow 19 coincides here with a straight line G which runs in the plane E2 and therefore perpendicularly to the plane E1 and intersects the pre-chamber 14, the injector 12 and the second spark plug 18. The straight line G runs here through the cylinder axis 5 (central axis) of the cylinder 3.

It can be seen from FIG. 1 that the injector 12 is an injector which is arranged at least substantially centrally with respect to the cylinder 3 or the combustion chamber 4, with the pre-chamber 14 being arranged offset in relation to the injector 12 toward the outlet side 10. The pre-chamber 14 is at least predominantly arranged here on the outlet side 10, with the injector 12 being at least predominantly, in particular completely, arranged on the inlet side 10. The spark plug 18 or the tip S thereof, at which an ignition spark can be produced in the combustion chamber 4 and outside the pre-chamber 14 with the spark plug 18, is also arranged completely on the inlet side 9. Furthermore, the pre-chamber 14 is at least partially, in particular at least predominantly, arranged between the outlet valves 13a, b arranged on the outlet side 10. In addition, an ignition point Z at which the ignition spark can be produced with the second spark plug 18 is arranged on the inlet side 9. The ignition point Z and therefore the tip S are arranged, as can be seen particularly readily from FIG. 2, in an edge region R of the combustion chamber 4, and therefore the second spark plug 18, the longitudinal axis or direction of longitudinal extent of which is shown in FIG. 2 by a chain-dotted line 20, is also referred to as an edge spark plug. The ignition point Z or the tip S is arranged here between the inlet valves 8a, b.

As can furthermore be seen particularly readily from FIGS. 1 and 2, the injector 12 is designed to inject the fuel directly into the combustion chamber 4 with formation of fuel jets K1, K2, K3, K4 and K5, which are formed by the fuel and are also referred to as injection jets, in such a manner that the fuel jets K1-5, in particular the respective central longitudinal axes thereof, bypass the pre-chamber 14 or the chamber elements 16, and consequently do not strike directly against the pre-chamber 14 or the chamber elements 16. Injectors with significantly more spray jets are also possible, e.g. seven or eight hole injectors. It is advantageous that the pre-chamber 14 is not struck by any injection jet and at least one jet is injected toward the edge spark plug.

At least or precisely one of the fuel jets K1-5, in the present case the fuel jet K5, is oriented in such a manner that it strikes directly against the second spark plug 18, in particular against the tip S thereof. The respective fuel jet K1-5 is, for example, a spray jet. It can be seen from FIG. 2 that the largest angle which the spark plug 18, in particular its longitudinal axis or direction of longitudinal extent, encloses with the plane E2 or with the cylinder axis 5 is greater than 90 degrees and less than 100 degrees. As a result, the spark plug 18 can be arranged particularly flatly, and therefore its tip S can be arranged particularly close to the injector 12, the longitudinal axis or direction of longitudinal extent of which is shown in FIG. 2 by a chain-dotted line 21. The spark plug 17, the longitudinal axis or direction of longitudinal extent of which is shown in FIG. 2 by a chain-dotted line 22 can also be advantageously arranged and in particular oriented relative to the combustion chamber 4 and relative to the injector 12 and relative to the spark plug 18. It can be seen from FIG. 2 that the longitudinal axes of the injector 12 and of the spark plug 17 each enclose the same angle with the plane E2 or with the cylinder axis 5 and run obliquely with respect to the plane E2 or obliquely with respect to the cylinder axis 5.

Figure 3:
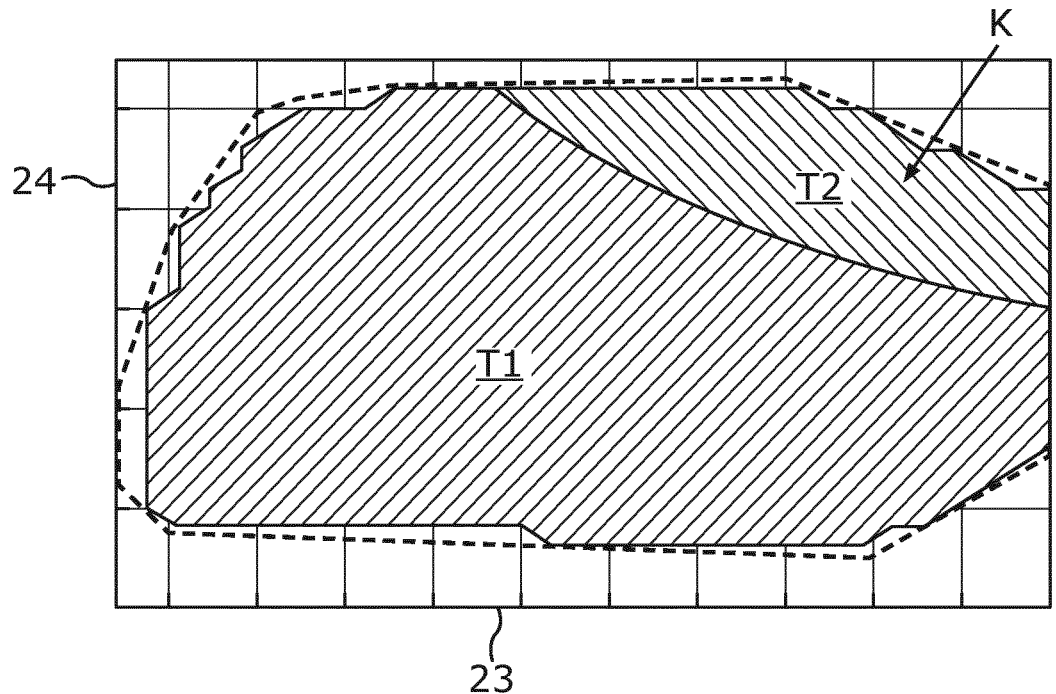
FIG. 3 shows a schematic illustration of a characteristic map, also referred to as engine characteristic map, of the internal combustion engine.

FIG. 3 shows a diagram, on the abscissa 23 of which the rotational speed of the internal combustion engine 1 or of the crankshaft thereof is plotted. The load of the internal combustion engine 1 is plotted on the ordinate 24. A or the characteristic map K, also referred to as engine characteristic map, of the internal combustion engine 1 is entered in the diagram shown in FIG. 3. The characteristic map K has at least or precisely two partial regions T1 and T2, wherein the partial region T2 adjoins the partial region T1, in particular directly, in the direction of higher rotational speeds and higher loads. A dual ignition is provided, for example, in the partial region T1. The dual ignition should be understood as meaning that in each case at least one ignition spark is produced, and therefore ignition brought about, both with the spark plug 17 and with the spark plug 18 in the partial region T1 within the respective operating cycle of the internal combustion engine 1. For example, first of all the edge spark plug is used to bring about ignition, whereupon the pre-chamber spark plug is used to bring about ignition in the pre-chamber 14. A single ignition is provided in the partial region T2, and therefore ignition is brought about with the pre-chamber spark plug in the partial region T2 within the respective operating cycle, and, consequently, at least one ignition spark is produced in the pre-chamber 14 with the first spark plug 17, and an ignition brought about by the edge spark plug, consequently production of an ignition spark brought about by the edge spark plug, is suppressed.

Figure 4:
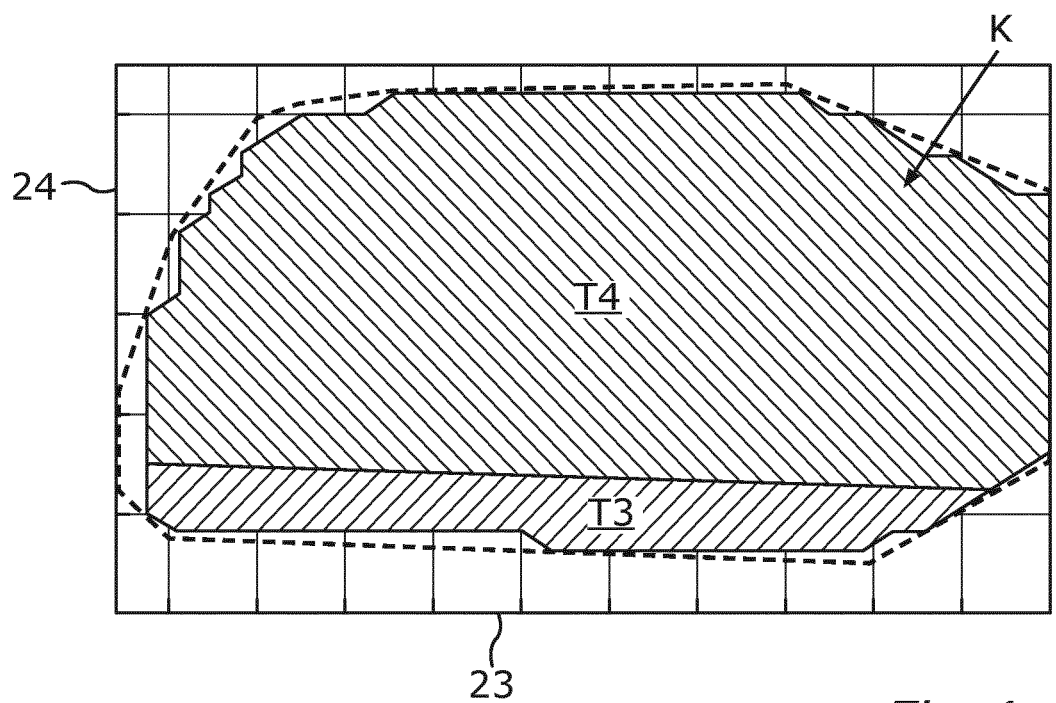
FIG. 4 shows a further schematic illustration of the characteristic map.

FIG. 4 shows the characteristic map K with further partial regions T3 and T4, wherein the partial region T4 can comprise the partial region T2 and/or the partial region T1 can comprise the partial region T3. A dual injection is provided in the partial region T3. This means that precisely two temporally consecutive injections which are spaced apart from one another are carried out with the injector 12 within respective operating cycles of the internal combustion engine 1 belonging to the partial region T3 of the characteristic map K, the respective injection causing the fuel to be directly injected into the combustion chamber 4 with the injector 12. It can be seen that the partial region T4 directly adjoins the partial region T3 in the direction of higher loads and optionally in the direction of higher rotational speeds.

Figure 5:
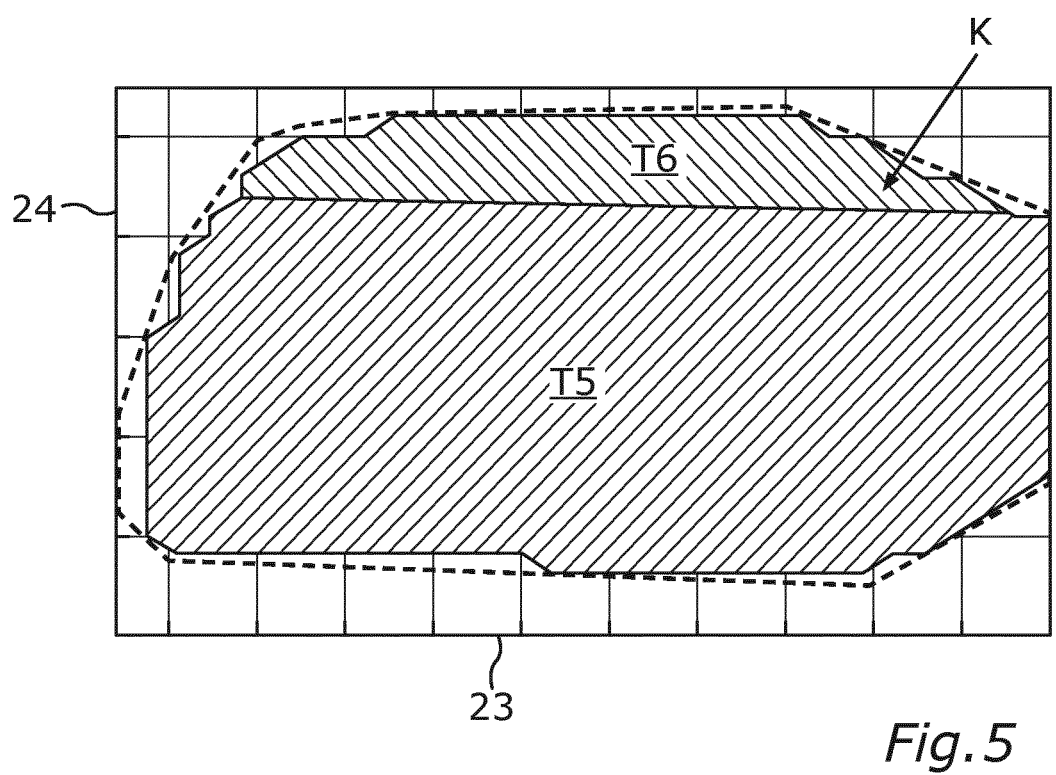
FIG. 5 shows a further schematic illustration of the characteristic map.

Finally, FIG. 5 shows the characteristic map K with two further partial regions T5 and T6, wherein the partial region T4 can comprise the partial region T6, and/or the partial region T5 can comprise the partial region T3. A triple injection is provided here in the partial region T6. This should be understood as meaning that precisely three temporally consecutive injections which are spaced apart from one another are carried out with the injector 12 within respective operating cycles of the internal combustion engine 1 belonging to the partial region T6, the respective injection causing the fuel to be injected directly into the combustion chamber 4 with the injector 12. Furthermore, it can be seen from FIG. 5 that the partial region T6 directly adjoins the partial region T5 in the direction of higher loads and/or rotational speeds.

LIST OF REFERENCE SIGNS

1 Internal combustion engine
2 Housing element
3 Cylinder
4 Combustion chamber
5 Cylinder axis
6 Combustion chamber roof
7a, b Inlet channel
8a, b Inlet valve
9 Inlet side
10 Outlet side
11a, b Outlet channel
12 Injector
13a, b Outlet valve
14 Pre-chamber
15 Passage openings
16 Chamber element
17 First spark plug
18 Second spark plug
19 Arrow
20 Chain-dotted line
21 Chain-dotted line
22 Chain-dotted line
23 Abscissa
24 Ordinate
E1 Plane
E2 Plane
G Straight line
K Characteristic map
K1-5 Fuel jet
R Edge region
S Tip
T1-6 Partial region
Z Ignition point

The invention claimed is:

1. An internal combustion engine, comprising:
a combustion chamber which is at least partially delimited by a cylinder;
an injector which is assigned to the combustion chamber and configured to inject a fuel directly into the combustion chamber such that a mixture comprising at least the fuel and an air is supplied to the combustion chamber;
a pre-chamber that is fluidically connected via at least one passage opening to the combustion chamber and configured such that a portion of the mixture can be supplied via the at least one passage opening into the pre-chamber;
a first spark plug which is configured to produce at least one ignition spark in the pre-chamber for igniting the portion of the mixture supplied via the at least one passage opening into the pre-chamber; and
a second spark plug which is assigned to the combustion chamber and which is configured to produce at least one ignition spark in the combustion chamber and outside the pre-chamber for igniting the mixture received in the combustion chamber, wherein
the pre-chamber, the injector, and the second spark plug are arranged in the following sequence along a direction running in a plane extending perpendicularly to an axial direction of the cylinder: the pre-chamber-the injector-the second spark plug, and wherein
the pre-chamber is arranged offset in relation to the injector toward an outlet side of the combustion chamber.

2. The internal combustion engine according to claim 1, wherein a straight line which runs parallel to the direction or coincides with the direction and which runs in the plane intersects the pre-chamber, the injector and the second spark plug.

3. The internal combustion engine according to claim 2, wherein
the straight line runs through the center axis of the cylinder.

4. The internal combustion engine according to claim 1, wherein
the pre-chamber is at least partially arranged between outlet valves of the internal combustion engine that are arranged on the outlet side and are assigned to the combustion chamber.

5. The internal combustion engine according to claim 1, further comprising:
an ignition point at which the ignition spark can be produced with the second spark plug.

6. The internal combustion engine according to claim 5, wherein
the ignition point is arranged in an edge region of the combustion chamber.

7. The internal combustion engine according to claim 5, wherein
the ignition point is arranged between inlet valves of the internal combustion engine that are arranged on an inlet side of the cylinder and are assigned to the combustion chamber.

8. The internal combustion engine according to claim 1, wherein
the injector is configured to inject the fuel directly into the combustion chamber with formation of one or more fuel jets formed by the fuel, such that a central longitudinal axis of at least one fuel jet bypasses the pre-chamber, wherein
at least one of the fuel jets strikes directly against a tip of the second spark plug, the tip being a location where the ignition spark is produced by the second spark plug.

9. A method for operating an internal combustion engine, the internal combustion engine comprising:
a combustion chamber which is at least partially delimited by a cylinder;
an injector which is assigned to the combustion chamber;
a pre-chamber that is fluidically connected via at least one passage opening to the combustion chamber;
a first spark plug; and
a second spark plug,
wherein the pre-chamber, the injector, and the second spark plug are arranged in the following sequence along a direction running in a plane extending perpendicularly to an axial direction of the cylinder: the pre-chamber-the injector-the second spark plug,
the method comprising:
injecting, with the injector, a fuel directly into the combustion chamber such that a mixture comprising at least the fuel and an air is supplied to the combustion chamber;
supplying a portion of the mixture into the pre-chamber via the at least one passage opening of the pre-chamber;
producing, with the first spark plug, at least one ignition spark in the pre-chamber for igniting the portion of the mixture supplied via the at least one passage opening into the pre-chamber; and
producing, with the second spark plug which is assigned to the combustion chamber, at least one ignition spark in the combustion chamber and outside the pre-chamber for igniting the mixture received in the combustion chamber;
wherein ignition times at which respective ignition sparks are produced with the second spark plug are set with an electronic computing device depending on at least one of a load, a temperature and a rotational speed of the internal combustion engine.

10. The method according to claim 9, wherein
within at least one operating cycle of the internal combustion engine, at least one first ignition spark for igniting the mixture in the combustion chamber is produced with the second spark plug, wherein
after the at least one first ignition spark is produced, at least one second ignition spark is produced in the pre-chamber with the first spark plug, wherein
production of an ignition spark by the first spark plug is suppressed within the operating cycle before the first ignition spark is produced with the second spark plug and during the production of the first ignition spark with the second spark plug.

11. The method according to claim 9, wherein
in at least a first partial region of a characteristic map of the internal combustion engine, respective ignition sparks are produced within respective operating cycles of the internal combustion engine both with the first spark plug and with the second spark plug, wherein
in at least a second partial region of the characteristic map, the second partial region, which comprises higher loads and higher rotational speeds than the first partial region, respective ignition sparks are produced within respective operating cycles of the internal combustion engine exclusively with the first spark plug.

12. The method according to claim 9, wherein
ignition times at which respective ignition sparks are produced with the second spark plug are set with an electronic computing device of the internal combustion engine independently of ignition times at which respective ignition sparks are produced with the first spark plug.

13. The method according to claim 9, wherein
ignition times at which respective ignition sparks are produced with the second spark plug are set with an electronic computing device on the basis of a first characteristic map which is independent of a second characteristic map, on the basis of which ignition times at which respective ignition sparks are produced with the first spark plug are set with the electronic computing device.

14. An internal combustion engine, comprising:
a combustion chamber receiving a cylinder;
an injector configured to inject a fuel into the combustion chamber such that a mixture comprising at least the fuel and an air is supplied to the combustion chamber;
a pre-chamber that is fluidically connected via at least one passage opening to the combustion chamber and configured such that a portion of the mixture can be supplied via the at least one passage opening into the pre-chamber;
a first spark plug which is configured to produce at least one ignition spark in the pre-chamber; and
a second spark plug which is configured to produce at least one ignition spark in the combustion chamber and outside the pre-chamber, wherein
the pre-chamber, the injector, and the second spark plug are arranged in sequence along a direction running in a plane extending perpendicularly to an axial direction of the cylinder such that the injector is located between the pre-chamber and the second spark plugs and wherein the pre-chamber is arranged offset in relation to the injector toward an outlet side of the combustion chamber.

15. The internal combustion engine according to claim 14, wherein a straight line which runs parallel to the direction or coincides with the direction and which runs in the plane intersects the pre-chamber, the injector and the second spark plug.

16. The internal combustion engine according to claim 15, wherein the straight line runs through the center axis of the cylinder.

17. The internal combustion engine according to claim 14, wherein the pre-chamber is at least partially arranged between outlet valves of the internal combustion engine that are arranged on the outlet side and are assigned to the combustion chamber.

\* \* \* \* \*